United States Patent
Ishii (10) Patent No.: US 8,456,777 B2
(45) Date of Patent: Jun. 4, 2013

(54) STORAGE MEDIUM EXCHANGING DEVICE WRONG INSERTION PREVENTING PART BLOCKING AT LEAST PART OF MOVABLE CELL NON-DOORWAY

(75) Inventor: Hiroaki Ishii, Tokyo (JP)

(73) Assignee: NEC Corporation, Tokyo (JP)

( * ) Notice: Subject to any disclaimer, the term of this patent is extended or adjusted under 35 U.S.C. 154(b) by 134 days.

(21) Appl. No.: 13/013,213

(22) Filed: Jan. 25, 2011

(65) Prior Publication Data

US 2011/0194386 A1 Aug. 11, 2011

(30) Foreign Application Priority Data

Feb. 5, 2010 (JP) .................................. 2010-24157

(51) Int. Cl.
G11B 23/04 (2006.01)
G11B 15/68 (2006.01)

(52) U.S. Cl.
USPC ................... 360/92.1; 369/30.66; 206/387.15

(58) Field of Classification Search
USPC ............. 360/92.1; 369/30.66; 312/9.22, 9.38, 312/319.1; 206/308.1, 387.1, 387.12, 387.15
See application file for complete search history.

(56) References Cited

U.S. PATENT DOCUMENTS

| 6,353,581 | B1 | 3/2002 | Offerman et al. | |
|---|---|---|---|---|
| 6,411,462 | B1 * | 6/2002 | Ostwald et al. | 360/92.1 |
| 2007/0230036 | A1 * | 10/2007 | Nave et al. | 360/92.1 |

FOREIGN PATENT DOCUMENTS

| DE | 10 2005 057 678 A1 | 6/2007 |
|---|---|---|
| JP | 10-106112 A | 4/1998 |
| JP | 10-241241 A | 9/1998 |
| JP | 2003076948 A | 3/2003 |
| JP | 2003513397 A | 4/2003 |
| JP | 2005222694 A | 8/2005 |
| WO | 200904375 A | 4/2009 |

OTHER PUBLICATIONS

German Office Action for DE 10 2011 003 635.0 issued Feb. 23, 2012.
Japanese Officeaction for JP2010-024157 issued Dec. 6, 2011.
audio-heritage.jp, "AIWA Specification of AIWA cassette deck AD-WX99", [online], Jan. 30, 2009, [searched Nov. 25, 2011], the internet <URL:http://web.archive.org/web/20090130042909/http://audio-heritage.jp/AIWA/player/ad-wx99.html>.
Japanese Office Action for JP2010-024157 mailed on Aug. 28, 2012.
AD-WX99 AIWA, Jan. 30, 2009, URL, http://web.archive.org/web/20090130042909/http://audio-heritage.jp/AIWA/player/ad-wx99.html.

* cited by examiner

Primary Examiner — Craig A. Renner (57) ABSTRACT

A storage medium exchanging device to discharge a movable cell, which is one of plural magazine cells for storing a storage medium inserted from a doorway, and to store the movable cell, include a carrying part on which the movable cell is mounted; and a wrong insertion preventing part which generates discharging force to make the carrying part discharge from the magazine and blocks at least a part of a non-doorway of the discharged movable cell.

4 Claims, 13 Drawing Sheets

STORAGE MEDIUM EXCHANGING DEVICE WRONG INSERTION PREVENTING PART BLOCKING AT LEAST PART OF MOVABLE CELL NON-DOORWAY

This application is based upon and claims the benefit of priority from Japanese Patent Application No. 2010-024157, filed on Feb. 5, 2010, the disclosure of which is incorporated herein in its entirety by reference.

TECHNICAL FIELD

The present invention relates to a library apparatus equipped with a magazine which stores a storage medium, a storage medium exchanging device which performs discharge and store of a movable cell, and a storage medium exchanging method.

BACKGROUND ART

A general library apparatus includes a magazine which is equipped with a plurality of magazine cells, a read/write device which reads data from a storage medium stored in the magazine cell and writes data in the storage medium, and an access device which carries the storage medium between the magazine and the read/write device. The magazine cell is arranged so as to store a plurality of storage media.

Then, the magazine is withdrawn from the library apparatus and one magazine cell is discharged from this magazine. Furthermore, the storage medium is withdrawn from the discharged magazine cell and afterward, the storage medium is stored again.

When the library apparatus is activated or the storage medium is stored, etc, the library apparatus carries out an inventory process in order to check the storage medium, which is stored in each magazine cell, and arrangement of the storage medium.

However, there is a problem that it takes a long time for the library apparatus, in which a large number of storage media are mounted densely, to carry out the inventory process.

Then, Japanese Patent Application Laid-Open No. 1998-106112 proposes an optical disc changer including a storage medium discharger which can make only a small number of magazine cells discharged, and enabling to store the storage medium only in the discharged magazine cell, etc.

Since the storage medium is withdrawn only from the specific magazine cell (referred to as a movable cell) and stored in the specific movable cell as mentioned above, it is possible to limit an object of the inventory process to the storage medium which is mounted in the movable cell. Accordingly, it is possible to reduce a time required for the inventory process.

Moreover, since the storage medium is withdrawn only from the movable cell and ill inserted only into the movable cell, an operator can withdraw and insert the storage medium on the basis of an intuitive judgment. That is, it becomes easy to withdraw and insert the storage medium.

By the way, it is necessary to mount the storage medium in a right direction, when mounting the storage medium in the magazine cell. However, the storage medium may be mounted in a wrong direction in some cases due to a human error, since the storage medium is mounted by the operator. Accordingly, it is necessary to arrange a mechanism to prevent the wrong insertion due to the human error (hereinafter, described as wrong insertion preventing mechanism).

However, the optical disc changer according to Japanese Patent Application Laid-Open No. 1998-106112 is not equipped with the wrong insertion preventing mechanism mentioned above. While it is possible to add the wrong insertion preventing mechanism of course, number of the storage media which can be stored in the library apparatus may become small in some cases due to the addition of the wrong insertion preventing mechanism. The reason is that there is a regulation on sizes in height and width of the library apparatus. When the library apparatus is mounted on a general rack, a size in depth of the library apparatus is restricted substantially by a size in depth of the rack.

In order to add the wrong insertion preventing mechanism under the condition of the regulation and the restriction, number of the storage media to be stored must be reduced so that a space for storing the wrong insertion preventing mechanism may be secured.

SUMMARY

A main object of the present invention is to provide a library apparatus, a storage medium exchanging device and a storage medium exchanging method, which can install a wrong insertion preventing mechanism for a storage medium and a discharging mechanism for a movable cell with saving a space.

A storage medium exchanging device to discharge a movable cell, which is one of plural magazine cells for storing a storage medium inserted from a doorway, and to store the movable cell, include a carrying part on which the movable cell is mounted; and a wrong insertion preventing part which generates discharging force to make the carrying part discharge from the magazine and blocks at least a part of a non-doorway of the discharged movable cell.

BRIEF DESCRIPTION OF THE DRAWINGS

Exemplary features and advantages of the present invention will become apparent from the following detailed description when taken with the accompanying drawings in which.

EXEMPLARY EMBODIMENT

An exemplary embodiment according to the present invention will be described. Further, while a magnetic tape is exemplified as a storage medium which is stored in a cartridge, it may be preferable to adopt any other storage medium, such as an optical disk, which can store data processed by an information processing apparatus.

Figure 1:
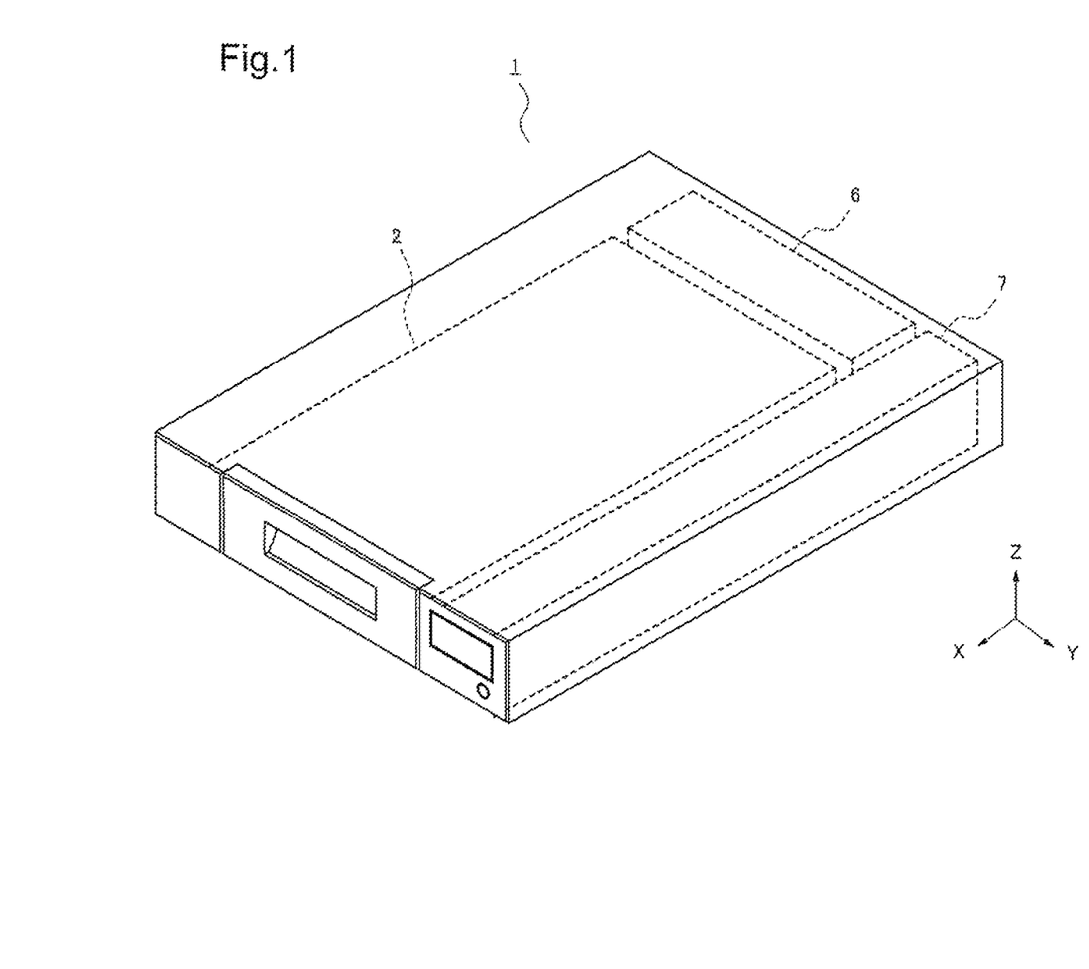
FIG. 1 is an outside view of a library apparatus according to an exemplary embodiment of the present invention.

FIG. 1 is an outside view of a library apparatus 1 according to the exemplary embodiment of the present invention. The library apparatus 1 includes a magazine 2 which stores the cartridge, a read/write device 6 and an access device 7. The read/write device 6 reads data from the storage medium and writes data in the storage medium. The access device 7 withdraws the storage medium from the magazine 2, and carries the storage medium to the read/write device 6, and stores the storage medium, from which the read/write device 6 reads data and in which the read/write device 6 writes data, in the magazine 2.

Figure 2:
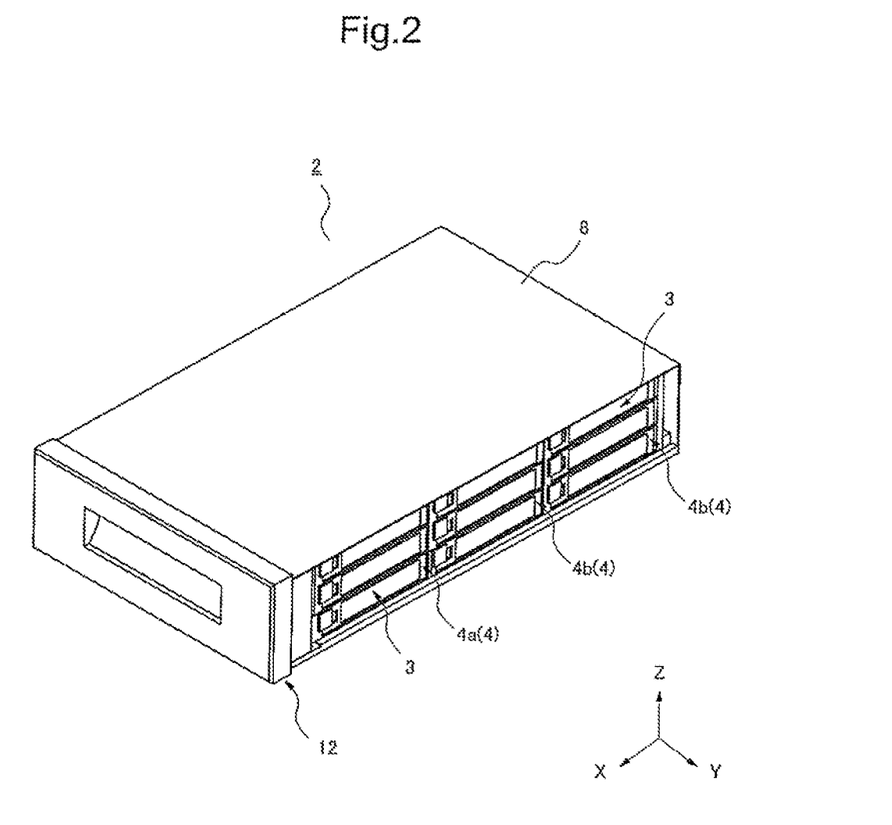
FIG. 2 is a perspective view of a magazine according to the exemplary embodiment.

FIG. 2 is a perspective view of the magazine 2 which is stored in the library apparatus 1. The magazine 2 includes a plurality of magazine cells 4 each of which stores a cartridge 3, a storage medium discharger 12 and a magazine case 8 which stores the magazine cell 4 and the storage medium discharger 12. Further, while it is exemplified in FIG. 2 that the magazine 2 stores a total of nine magazine cells 4 in three tiers and three lines, the present invention does not limit number of the magazine cells 4.

Figure 6:
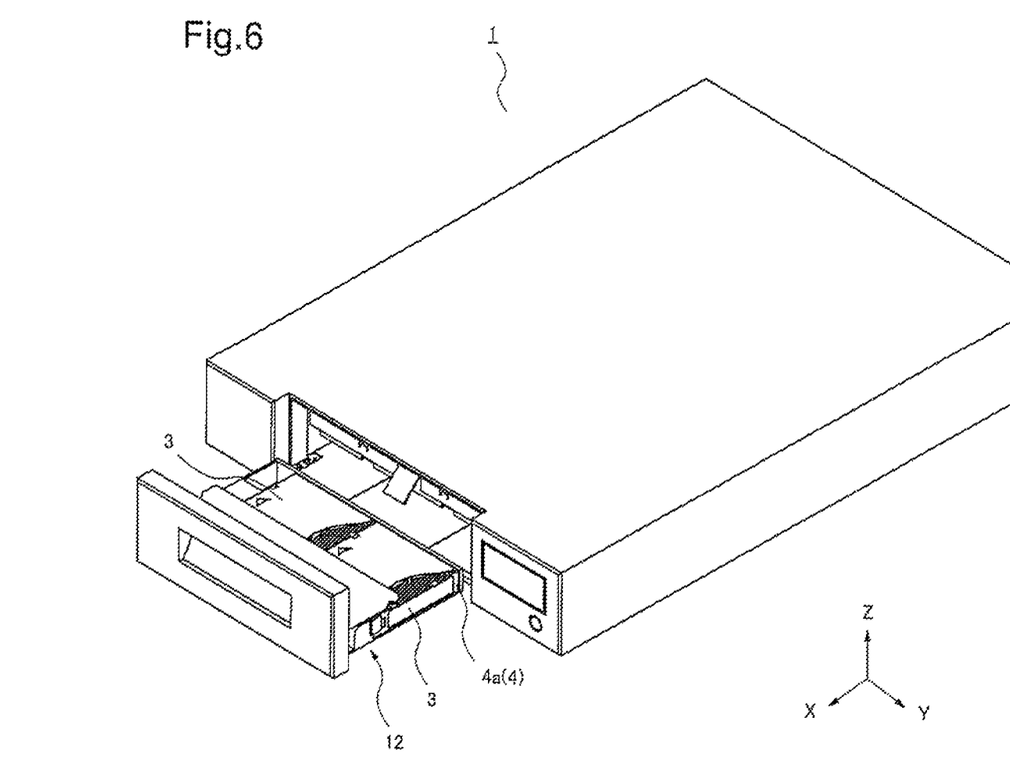
FIG. 6 is a perspective view of the library apparatus, from which the movable cell is discharged, according to the exemplary embodiment.

The magazine cell 4 includes two kinds of cells, that is, a cell which is discharged from the library apparatus 1 and a cell which is not discharged. Each cell stores a plurality of cartridges 3. Hereinafter, the magazine cell 4 which is discharged from the library apparatus 1 is denoted as a movable cell 4a, and the magazine cell 4 which is not discharged is denoted as a fixed cell 4b. For example, FIG. 6 shows a state that the movable cell 4a is withdrawn out of the library apparatus 1.

While the movable cell 4a and the fixed cell 4b have the same structure from a point of view of the function to store the cartridge 3, the movable cell 4a is different from the fixed cell 4b in a point that the movable cell 4a has a part of structure of the storage medium discharger 12 as mentioned later. Accordingly, the movable cell 4a and the fixed cell 4b are just denoted as the magazine cell 4 in the following description, in the case that it is unnecessary to classify the movable cell 4a and the fixed cell 4b each other. Number of the cartridges 3 which the magazine cell 4 stores, and a method for storing the cartridge 3 do not limit the present invention.

Figure 3:
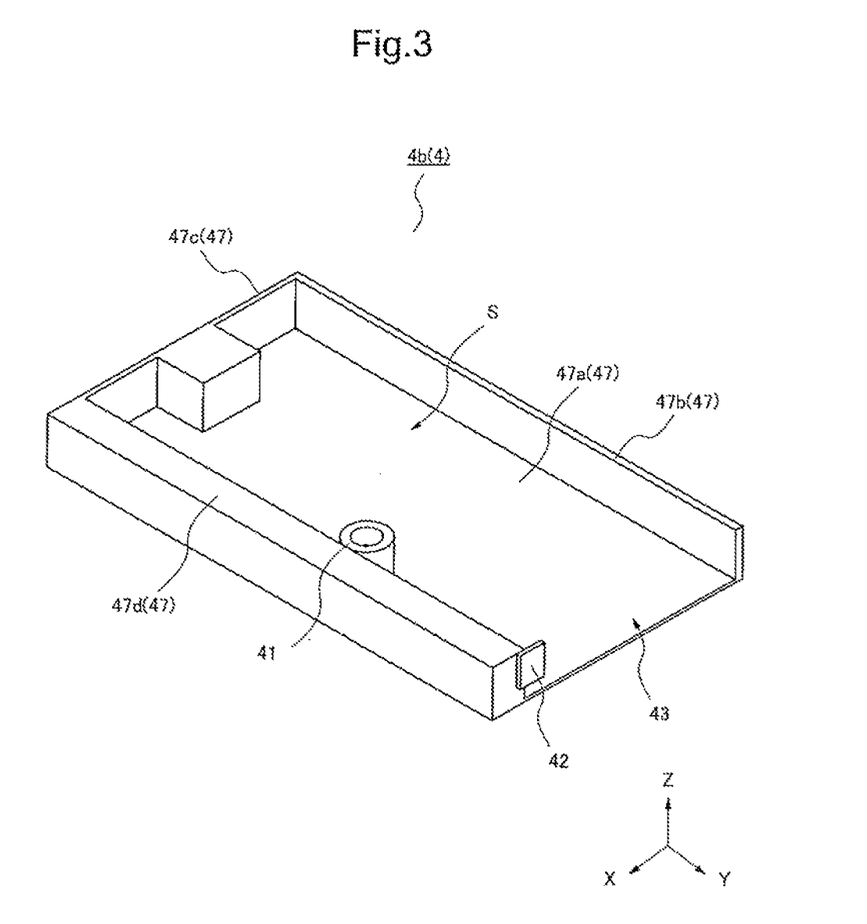
FIG. 3 is a perspective view of a fixed cell, which does not store a cartridge, according to the exemplary embodiment.
Figure 4:
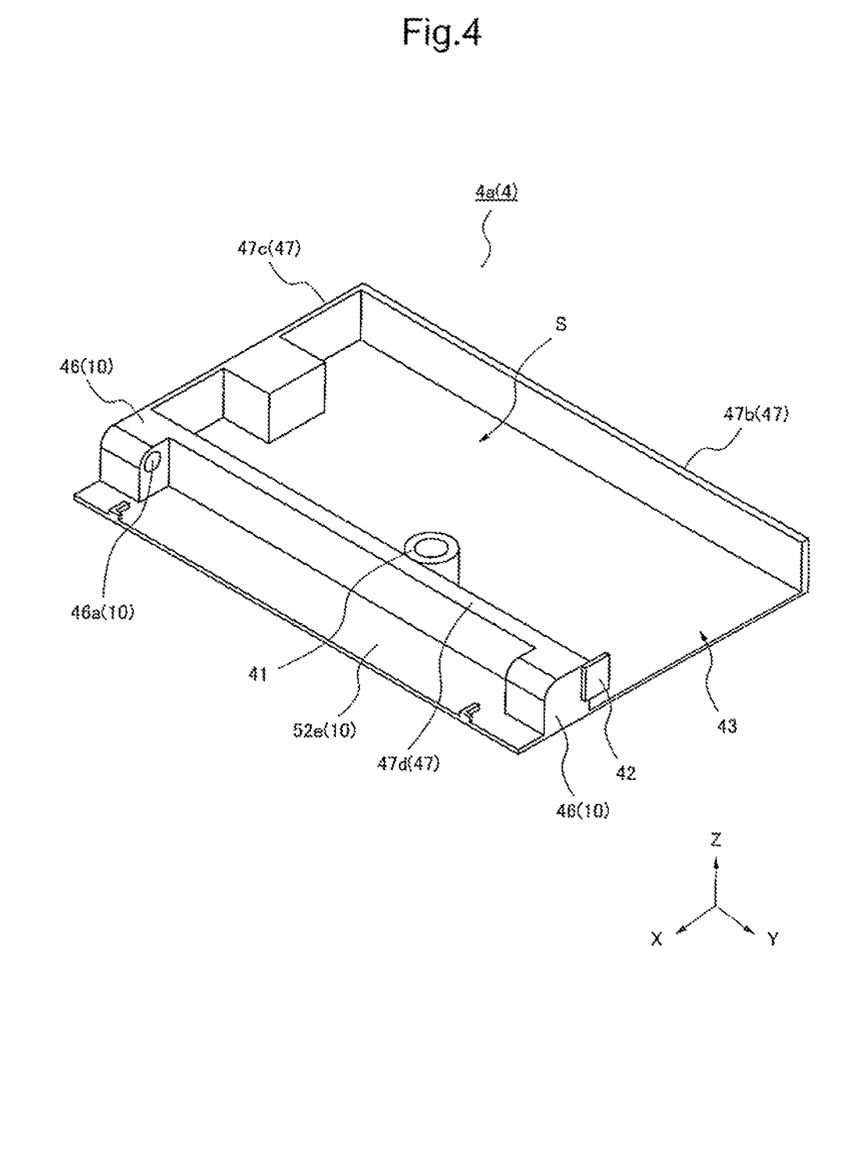
FIG. 4 is a perspective view of a movable cell, which does not store a cartridge, according to the exemplary embodiment.

FIG. 3 is a perspective view of the fixed cell 4b which does not store the cartridge 3. Moreover, FIG. 4 is a perspective view of the movable cell 4a which does not store the cartridge 3. A configuration of the magazine cell 4 will be described in the following with reference to FIG. 3.

As shown in FIG. 3, the magazine cell 4 includes an extruding member 41, a cartridge locking unit 42 and a frame 47. The frame 47 is composed of a bottom plate 47a on which the cartridge 3 is mounted, and side plates 47b to 47d which are arranged vertically around the bottom plate 47a. A space, which is enclosed by the bottom plate 47a and the side plates 47b to 47d, forms a cartridge storing region S. A side part of the cartridge storing region S, which is opposite to the side plate 47c, is opened, and the opened part is corresponding to a doorway 43 through which the cartridge 3 is inserted into the cartridge storing region S and through which the cartridge 3 is withdrawn.

The extruding member 41 is arranged so as to be movable along the side plate 47d or the side plate 47b, and moreover, the extruding member 41 is urged against the doorway 43 side by an elastic member (not shown in the figure).

Figure 5:
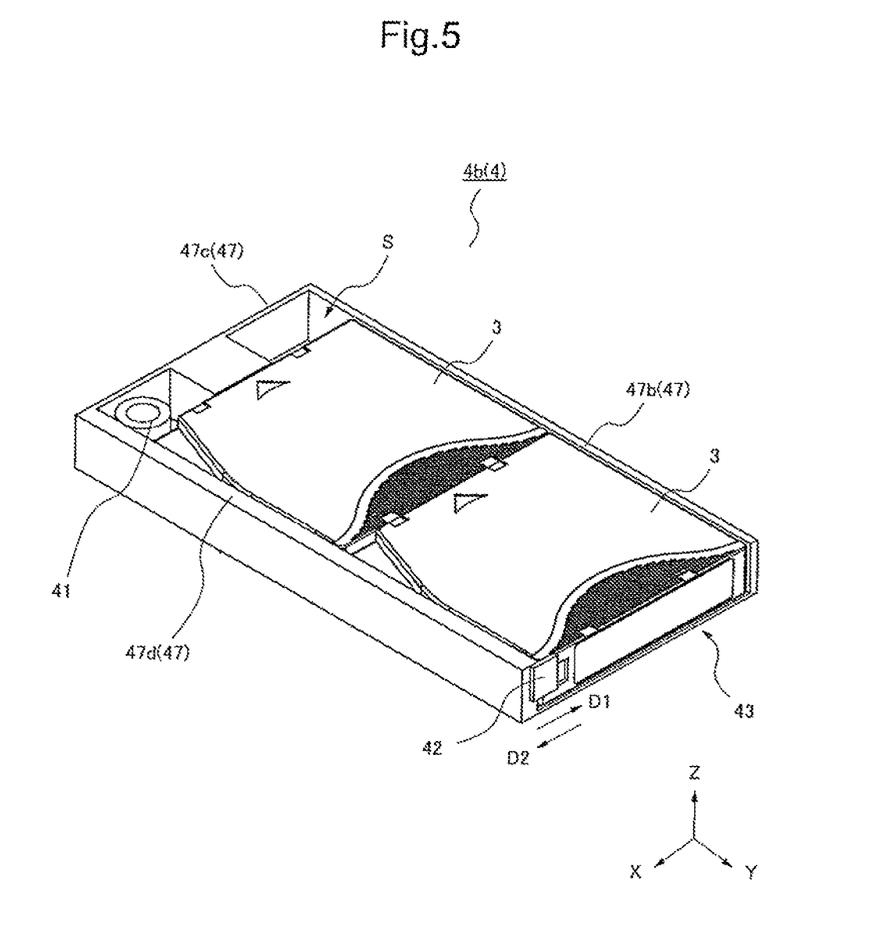
FIG. 5 is a perspective view of a magazine cell, which stores a cartridge, according to the exemplary embodiment.

FIG. 5 is a perspective view of the magazine cell 4 which stores the cartridge 3. As shown in FIG. 5, the extruding member 41 is pushed into the side plate 47c side by the cartridge 3 being inserted. At this time, the extruding member 41 receives force from the elastic member in a direction to the doorway 43 and then, extrudes the cartridge 3 from the magazine cell 4.

Accordingly, the inserted cartridge 3 will be slipped out from the magazine cell 4 if being in this state continuously. That is, it is impossible to store and hold the cartridge 3 within the magazine cell 4. Then, the cartridge locking unit 42 prevents the cartridge 3 from being slipped out from the magazine cell 4.

The cartridge locking unit 42 has an elastic member (not shown in the figure) and projects always into a direction which is indicated by an arrow D1 in FIG. 5. That is, it is an ordinary state that the cartridge locking unit 42 covers a part of the doorway 43. For this reason, the cartridge 3, which is stored in the cartridge storing region S, is extruded by the extruding member 41 to be in contact with the cartridge locking unit 42. Accordingly, the cartridge 3 is prevented from being slipped out from the magazine cell 4. The state is called a cartridge locking state.

An operator and the access device 7 withdraw the cartridge 3 from the magazine cell 4 and insert the cartridge 3 into the magazine cell 4. At this time, the operator and the access device 7 move the cartridge locking unit 42 in a direction which is indicated by an arrow D2 to release the cartridge locking state. When the cartridge locking state is released, the cartridge 3, which is stored in the magazine cell 4, is extruded by the extruding member 41.

Figure 7:
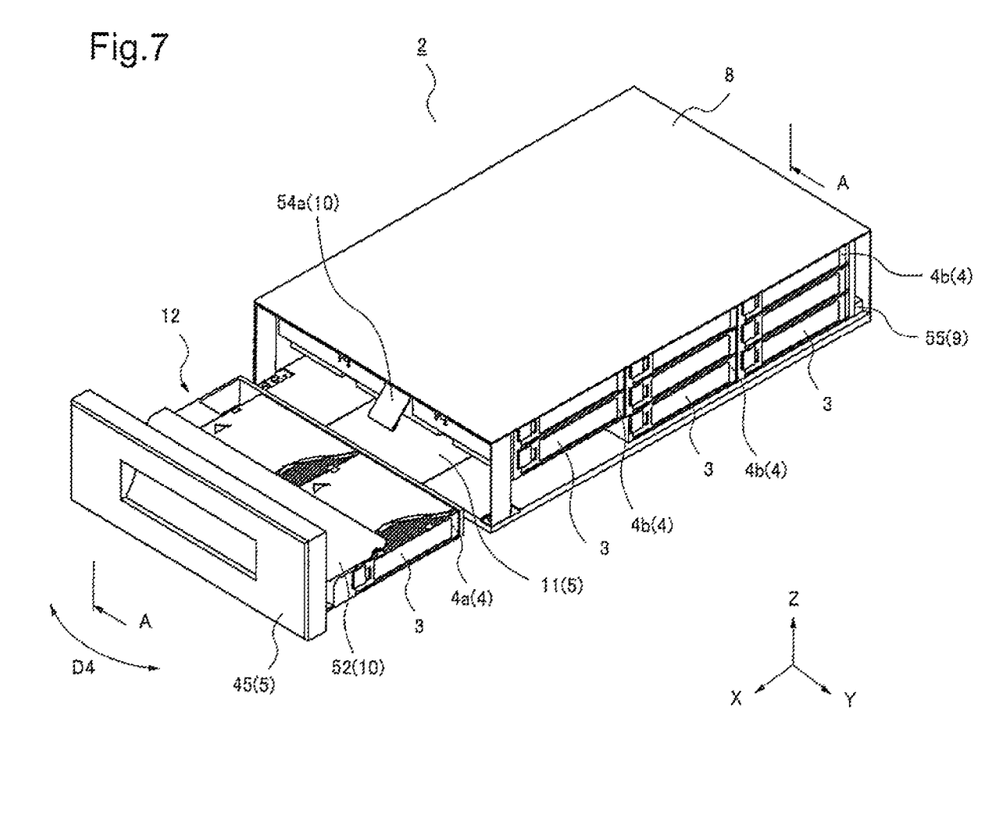
FIG. 7 is a perspective view of the magazine, from which the movable cell is discharged, according to the exemplary embodiment.
Figure 8:
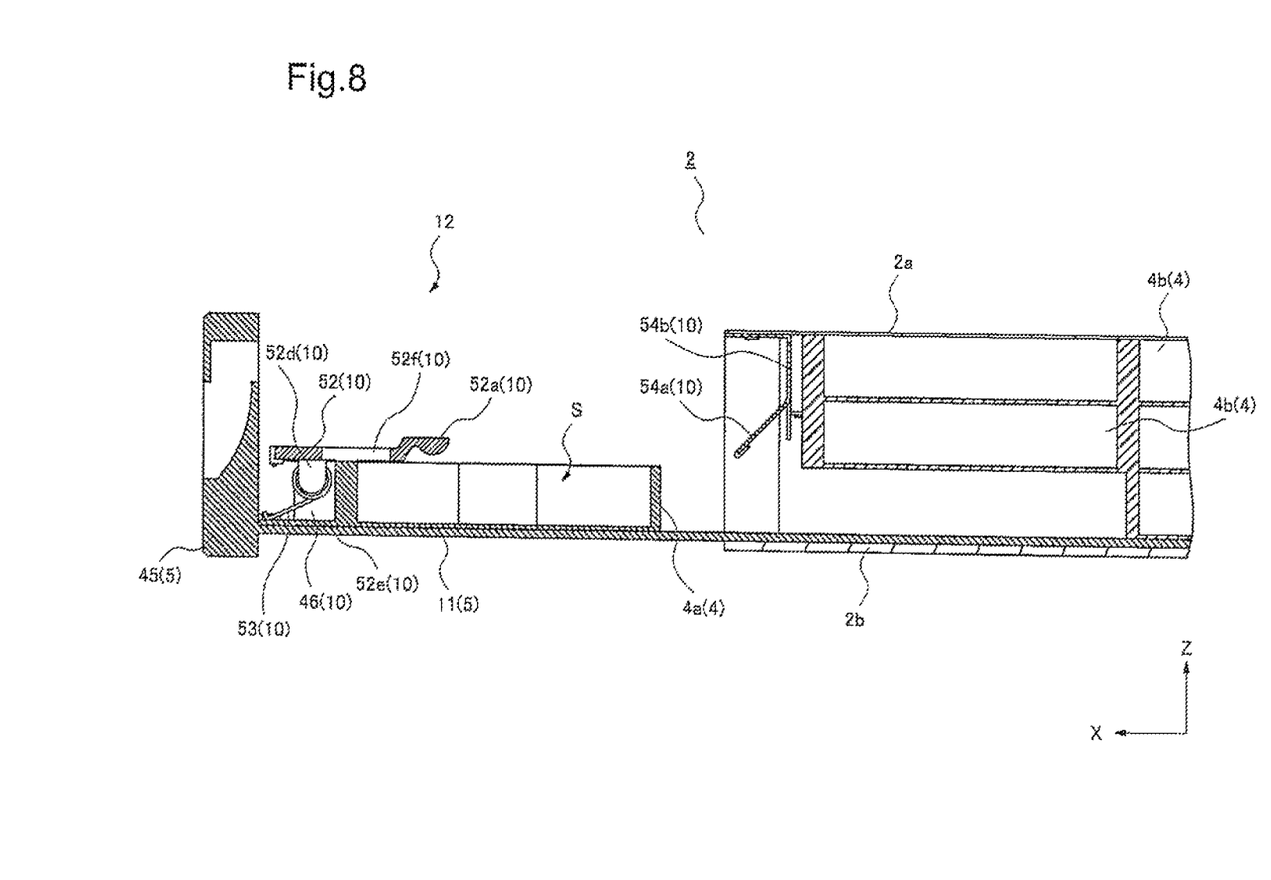
FIG. 8 is a cross section view of the magazine, from which the movable cell is discharged, according to the exemplary embodiment.
Figure 9:
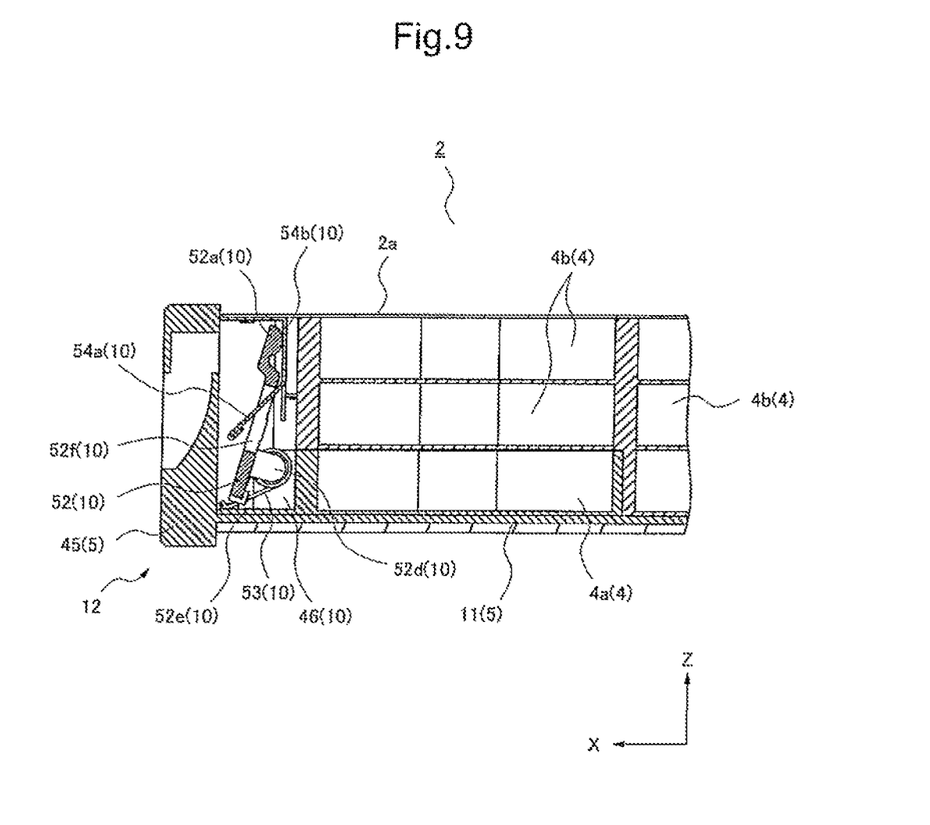
FIG. 9 is a cross section view of the magazine, which stores the movable cell, according to the exemplary embodiment.
Figure 10:
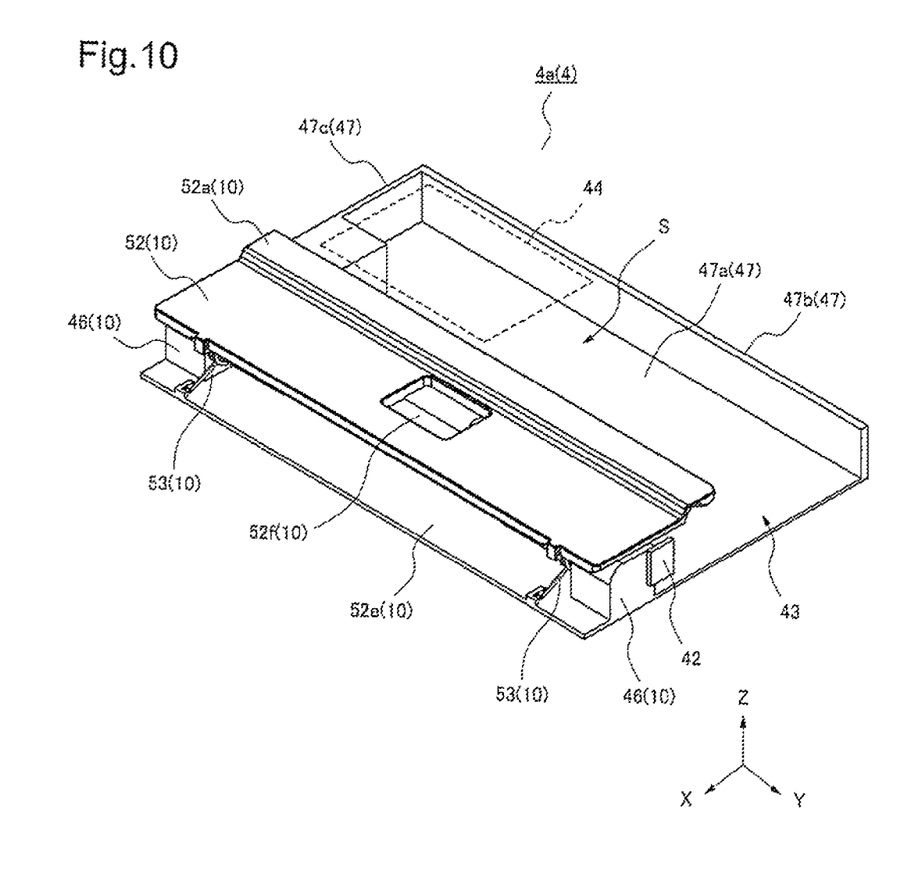
FIG. 10 is a perspective view of the movable cell according to the exemplary embodiment.

Next, the storage medium discharger 12, which withdraws and inserts the movable cell 4a, will be described. FIG. 6 is a perspective view of the library apparatus 1 which is in a state that the storage medium discharger 12 is discharged. FIG. 7 is a perspective view of the magazine 2 which is in a state that the storage medium discharger 12 is discharged. FIG. 8 is A-A cross section view of the magazine 2 shown in FIG. 7. FIG. 9 is a fragmentary cross section view of the magazine 2 which stores the storage medium discharger 12. FIG. 10 is a perspective view of the movable cell 4a. Further, the movable 4a shown in FIG. 4 is in a state that a flapper, a flapper supporting pillar and a flapper supporting plate, which are components of the storage medium discharger 12 mentioned later, are removed.

As shown, for example in FIG. 7 and FIG. 8, the storage medium discharger 12 includes a discharge part 5, a unit locking part 9 and a wrong insertion preventing part 10. The discharge part 5 includes a lid 45 of the magazine 2 and a base plate 11 which is joined to the lid 45. The movable cell 4a is fixed on the base plate 11, and slides on a bottom plate 2b of the magazine 2. Accordingly, if the discharge part 5 is discharged from the magazine 2, the movable cell 4a, which is mounted on the discharge part 5, is also discharged from the magazine 2.

Further, when the discharge part 5 is discharged or stored, the discharge part 5 may be inclined on the bottom plate of the magazine 2 in some cases. An arrow D4 in FIG. 7 indicates the inclination. In order to prevent the inclination, it is desirable to arrange a guide mechanism in the discharge part 5. As the guide mechanism, a configuration, in which a concave part (or convex part) is made on the base plate 11 of the discharge part 5, and a convex part (or concave part) which is fitted into the concave part is made on the bottom plate 2b of the magazine 2, is exemplified.

The unit locking part 9 includes an engaging part (not shown in the figure) which is made on the magazine 2, and an engaged part (not shown in the figure) which is made on the base plate 11 to engage with the engaging part. The engagement between the engaging part and the engaged part is released by handling a lock releasing button 55 shown in FIG. 7. For example, the access device 7 handles the lock releasing button 55. Further, a pick and a hole for the pick are exemplified as the engaged part and as the engaging part respectively.

As shown in FIG. 8 and FIG. 10, the wrong insertion preventing part 10 includes a flapper 52, a supporting pillar 46, a flapper spring 53, a flapper opening and closing board 54a, a flapper holding board 54b or the like. The flapper 52, the supporting pillar 46 and the flapper spring 53 are mounted on the movable cell 4a, and the flapper opening and closing board 54a and the flapper holding board 54b are stuck to a top plate 2a of the magazine 2.

A front end part 52a of the flapper 52 (end part in the cartridge storing region S side) is made in a thick wall form and its lower surface is made in an arc form. As shown in FIG. 8, a flapper axis 52d is arranged near both ends of the flapper 52 on a lower surface of the flapper 52. This flapper axis 52d is inserted into a shaft hole 46a (refer to FIG. 4) which is made in the supporting pillar 46. The flapper spring 53 is arranged so as to wrap the flapper axis 52d. One end of the flapper spring 53 is in contact with back end side which is opposite to the front end 52a of the flapper 52, and the other end of the flapper spring 53 is in contact with a flapper supporting plate 52e. Accordingly, the flapper 52 is urged against the cartridge storing region S side by spring force of the flapper spring 53, as the flapper 52 makes the flapper axis 52d work as a rotationally moving axis. Furthermore, an interference preventing hole 52f is made at a place almost near the center of the flapper 52.

Meanwhile, the flapper opening and closing board 54a is in contact with the front end part 52a of the flapper 52, when the discharge part 5 is pushed into the magazine 2. Accordingly, the flapper 52 tilts in a counterclockwise direction in FIG. 8 according to pushing the discharge part 5 into the magazine 2. The flapper holding board 54b maintains that the flapper 52 is in an open state. Then, in the case that the discharge part 5 is pushed by predetermined length, the unit locking part 9 locks the discharge part 5. Hereinafter, a state in which the flapper 52 covers the cartridge storing region S (state shown in FIG. 8), and a state in which the flapper 52 is in contact with the flapper holding board 54b (state shown in FIG. 9) are described as a closed state and an opened state respectively. Since spring force of the flapper spring 53 works on the flapper 52 in the opened state, the flapper 52 urges the flapper holding board 54b by the spring force.

Figure 11:
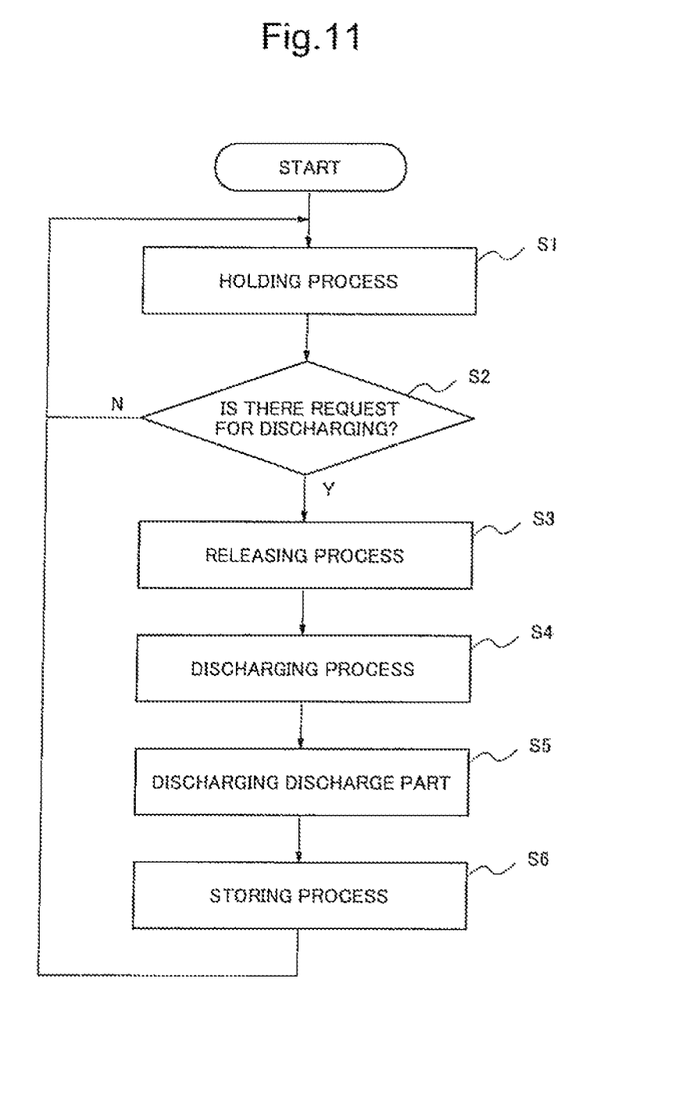
FIG. 11 is a flowchart showing a process, which is carried out when exchanging a cartridge, etc, according to the exemplary embodiment.

Next, a process, which an operator carries out when the operator exchanges the cartridge 3 or mounts the cartridge 3 newly, will be described according to a flowchart shown in FIG. 11. First, the discharge part 5 is pushed into the magazine 2, and the flapper 52 is in the opened state shown in FIG. 9 (Step S1). The discharge part 5 is locked by the unit locking part 9. In the opened state, the flapper 52 receives spring force, which makes the flapper 52 be in the closed state, from the flapper spring 53.

In the state, the operator issues a discharge direction to the library apparatus 1 in order to exchange the cartridge 3 or to mount the cartridge 3 newly, etc. When the library apparatus 1 receives the discharge direction (Step S2), the library apparatus 1 handles the lock releasing button 55 to release the discharge part 5 from being locked (Step S3).

When unlocked, the flapper 52 transits from the opened state to the closed state. The discharge part 5 is discharged from the magazine 2 by the flapper 52 is entering into the closed state, and consequently, a state shown in FIG. 6 is obtained (Step S4).

In the opened state, the flapper 52 becomes almost vertically and the front end part 52a of the flapper 52 is positioned near the top plate 2a of the magazine 2. That is, the flapper 52 is made so that the flapper axis 52d and the front end part 52a of the flapper 52 may be as apart as possible each other (hereinafter, distance between the flapper axis 52d and the front end part 52a is described as moment length). Since the moment length is made long, the discharge part 5 is discharged with a strong moment and its discharge distance becomes long. Accordingly, the operator can know easily, by the movable cell is being discharged, to be in a state in which it is possible to exchange the cartridge.

When the discharge part 5 is discharged, the operator exchanges the cartridge 3 (Step S5). At this time, it is impossible to carry the cartridge 3 to the read/write device 6, if the cartridge 3 is stored wrong. Then, the wrong insertion preventing part 10 prevents the cartridge 3 from being inserted wrong according to the present invention. A wrong insertion preventing operation will be described by use of FIG. 10. Further, as shown in FIG. 10, the movable cell 4a has an opening in addition to the doorway 43. The opening is described as a non-doorway 44. The non-doorway 44 is corresponding to an area which does not include the doorway 43 out of the openings of the movable cell 4a.

Figure 12:
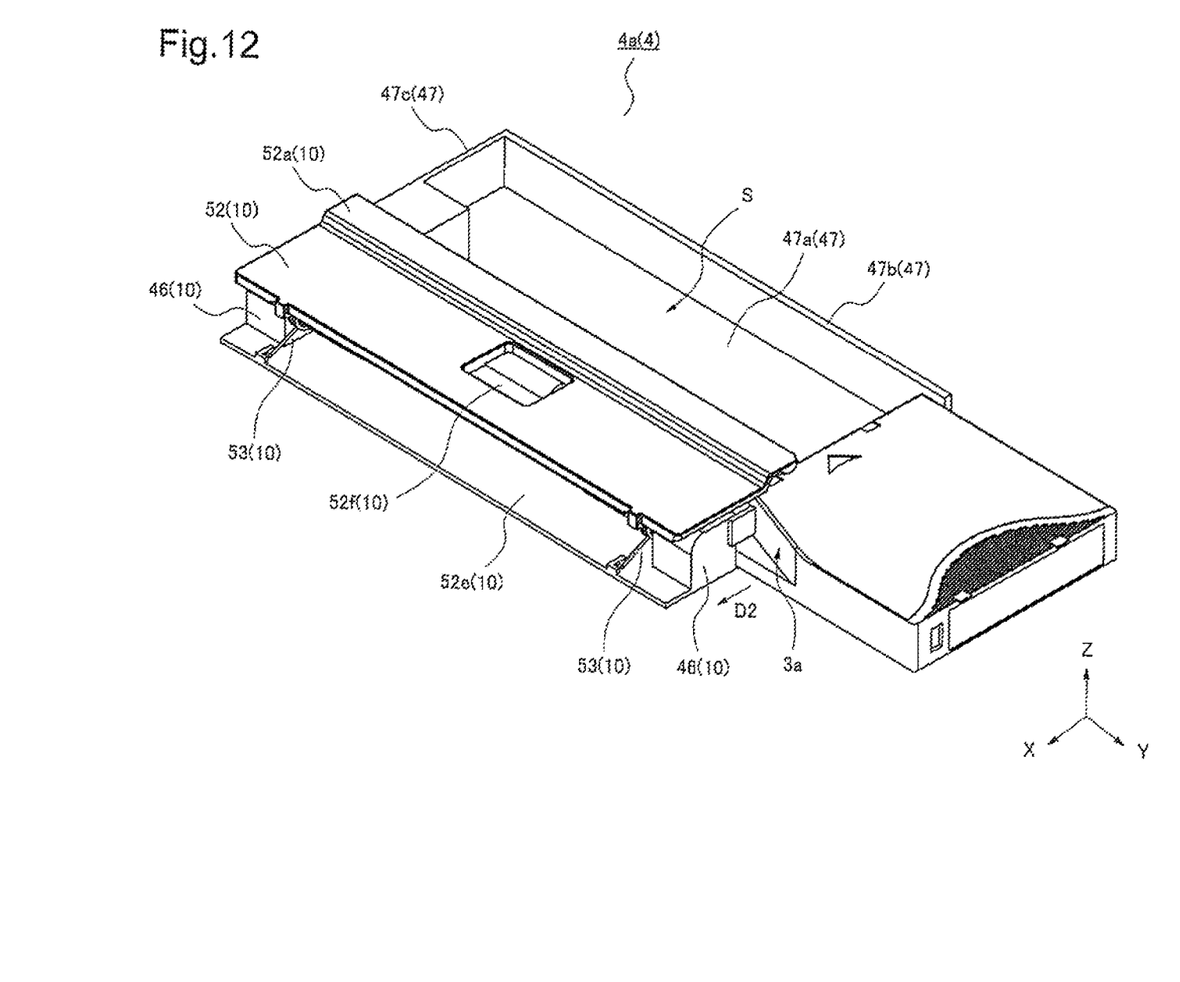
FIG. 12 shows a state generated at a time when the cartridge is inserted from a doorway, according to the exemplary embodiment.

In the case that the cartridge 3 is withdrawn and inserted through the doorway 43, there is no case that the cartridge 3 is inserted wrong. FIG. 12 shows a state of the movable cell 4a generated at a time when the cartridge 3 is inserted from the doorway 43. A tapered part 3a is made in the cartridge 3 inserting side. Accordingly, it is possible to insert the cartridge 3, since the tapered part 3a makes the cartridge locking unit 42 move back in a direction, which is indicated by an arrow D2 in FIG. 12, in the case that the cartridge 3 is inserted from the tapered part 3a side. However, since the cartridge 3 is in contact with the cartridge locking unit 42 in the case that the cartridge 3 tries to be inserted in a state except for the state mentioned above, it is prevented to insert the cartridge 3. Since it is possible to insert the cartridge 3 only if the cartridge 3 is inserted from the doorway 43 in the proper state as mentioned above, it is possible to prevent the wrong insertion.

However, it is possible to insert the cartridge 3 from the non-doorway 44 in the case that the flapper 52 is not mounted, since the non-doorway 44 is in a completely opened state. In this case, there is a fear that the cartridge 3 is inserted wrong, since any means to restrict a direction of inserting the cartridge 3 is not mounted.

Figure 13:
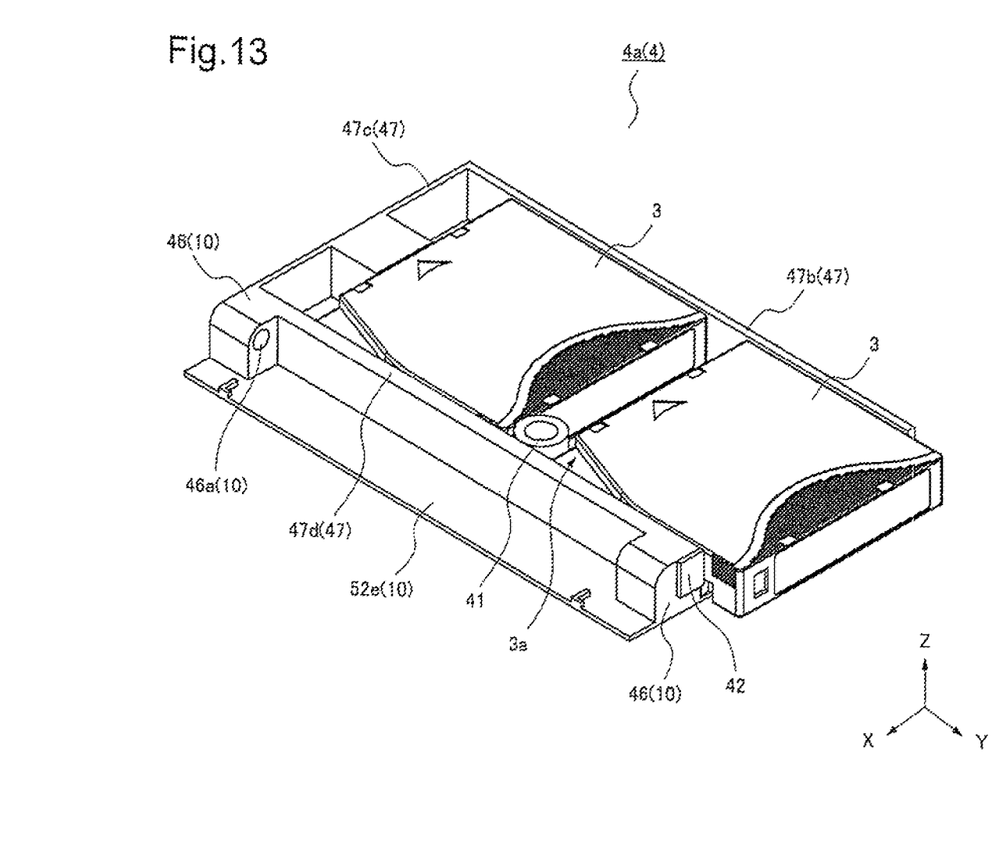
FIG. 13 shows wrong insertion of the cartridge according to the exemplary embodiment.

Moreover, the extruding member 41 has to be positioned between the cartridge 3 and the side plate 47c, when the cartridge 3 is inserted. However, the extruding member 41 may not be positioned between the cartridge 3 and the side plate 47c in some cases if the cartridge 3 is inserted from the non-doorway 44. FIG. 13 shows such a case as an exemplification. While the cartridge 3 shown in FIG. 13 is inserted in the right direction, the extruding member 41 exists between two cartridges 3. In this case, it is impossible to discharge the cartridge 3 since the cartridge 3 in the side plate 47c side is not extruded by the extruding member 41.

However, according to the present invention, it is impossible to insert the cartridge 3 from the non-doorway 44, since the flapper 52 covers a part of the non-doorway 44 in the state that the movable cell 4a is discharged outside the apparatus as mentioned above. Therefore, it is possible to prevent the cartridge 3 from being inserted wrong.

In the case that the cartridge 3 is mounted properly, the operator pushes the discharge part 5 into the library apparatus 1 (Step S6). By pushing the discharge part 5, the flapper 52 is in contact with the flapper opening and closing board 54a. In the case that the discharge part 5 is pushed furthermore, the flapper 52 is guided by the flapper opening and closing board 54a to enter into the opened state, and then, the flapper 52 is in contact with the flapper holding board 54b. In the case that the flapper 52 is in contact with the flapper holding board 54b, the discharge part 5 is locked by the unit locking part 9.

As described above, the flapper is mounted on the movable cell through the flapper spring so as to be able to rotate, and consequently, the flapper is given rotation force. As a result, when the movable cell is discharged, the rotation force which works on the flapper is converted into linear motion force. Then, the discharge part is discharged and in parallel, the flapper covers the non-doorway of the withdrawn cell. Accordingly, it is possible to reduce number of components and to save a space, since motion of the flapper has functions of discharging and preventing the wrong insertion.

Further, it may be preferable that the doorway for the storage medium is arranged not only in the side plate but also in the other board. Moreover, it may be preferable that the movable cell is discharged not only in the horizontal direction but also in the vertical direction, the slant direction or the other direction.

Moreover, it may be preferable that the flapper is not only in the board shape but also in another shape which can prevent the storage medium from being inserted wrong into the movable cell. The present invention can provide the library apparatus, which can install the wrong insertion preventing mechanism and the storage medium exchanging device with saving a space, and it is preferable that the library apparatus is applied as a library apparatus which requires high density packaging within a standardized area.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

The invention claimed is:

1. A storage medium exchanging device to discharge a movable cell, which is one of plural magazine cells for storing a storage medium inserted from a doorway, and to store the movable cell, comprising:
　a carrying part on which the movable cell is mounted;
　a wrong insertion preventing part which generates discharging force to make the carrying part discharge from a magazine and blocks at least a part of a non-doorway of the discharged movable cell; and
　a unit locking part which positions the carrying part within the magazine against the discharging force,
　wherein the wrong insertion preventing part includes:
　　a flapper which is arranged so as to be movable rotationally:
　　a flapper spring which urges the flapper against the non-doorway side; and
　　a flapper opening and closing board to make the flapper evacuate from the non-doorway against force, which the flapper spring generates, when the carrying part is stored in the magazine,
　　wherein the carrying part is discharged by the discharging force corresponding to spring force which the flapper spring generates when the flapper is evacuated from the non-doorway by the flapper opening and closing board.

2. The storage medium exchanging device according to claim 1, wherein
　the wrong insertion preventing part includes a flapper holding board to hold the flapper which is evacuated from the non-doorway by the flapper opening and closing board.

3. The storage medium exchanging device according to claim 1, wherein the flapper includes an interference preventing hole into which the flapper opening and closing board enters, when the flapper is evacuated from the non-doorway by the flapper opening and closing board.

4. The storage medium exchanging device according to claim 1, wherein
　a front end part of the flapper, which is guided by the flapper opening and closing board, is made in an arc form.

* * * * *